Jan. 14, 1964

F. F. CLARE 3,117,405

COTTON SALVAGING MACHINE (ROTOR TYPE)

Filed Sept. 18, 1961

INVENTOR.
Forrest F. Clare
BY Scott L. Norvell
atty.

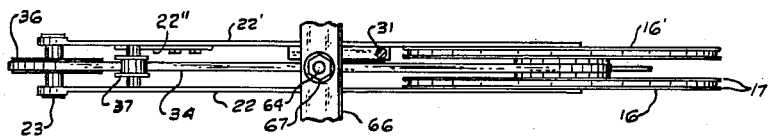
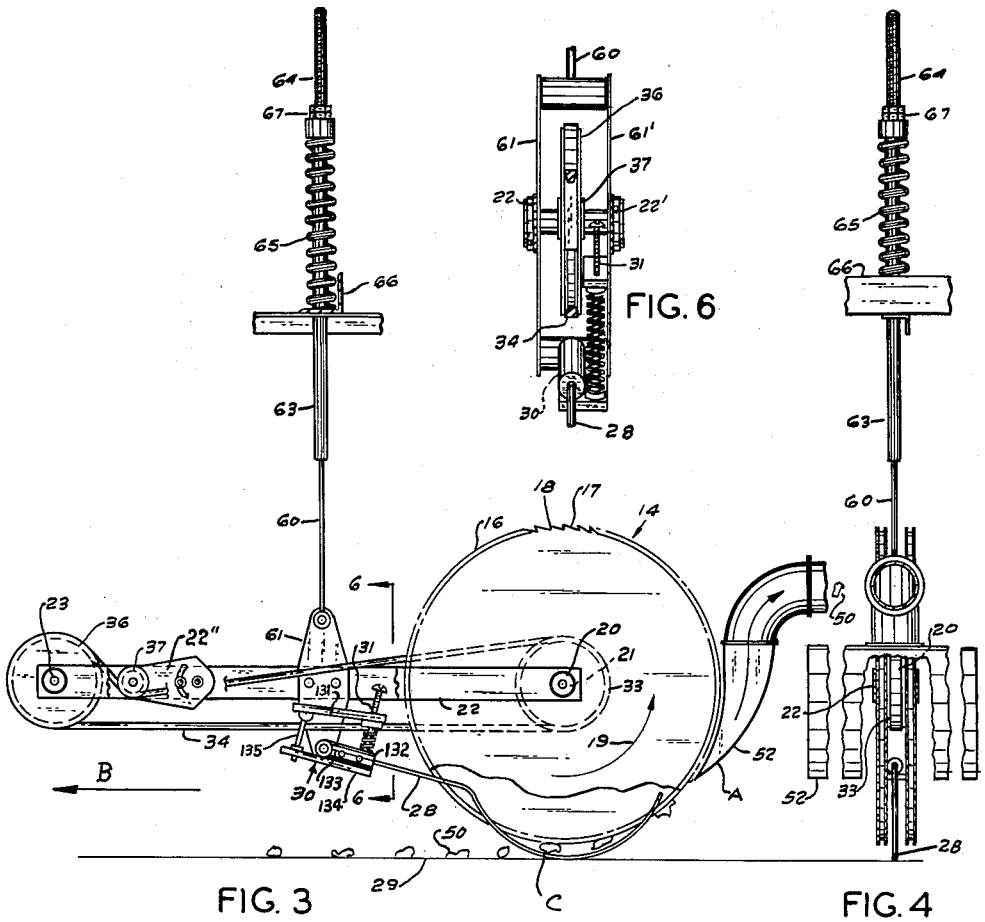

United States Patent Office 3,117,405
Patented Jan. 14, 1964

3,117,405
COTTON SALVAGING MACHINE (ROTOR TYPE)
Forrest F. Clare, Box 274, Gilbert, Ariz., assignor of fifty percent to Hugh Gieszl, Gilbert, Ariz.
Filed Sept. 18, 1961, Ser. No. 138,791
4 Claims. (Cl. 56—11)

This invention concerns a cotton salvaging machine.

One of the objects of the invention is to provide a cotton salvaging machine that is light and efficient and may be operated on the front end of a cotton picking machine of any common or well known type by removing the cotton picking mechanism and supplanting it with the cotton salvaging machine herein described.

Another object is to provide a cotton salvaging machine wherein the cotton is secured by the use of double row gin saws of the type sometimes used in gins for cleaning cotton.

Still another object is to provide a suction means which will remove the cotton from the saw-like rotors as they travel over the ground in a direction comparative to the direction they would roll if in contact with the ground.

Still another object is to provide cotton gleaning devices consisting of a plurality of rotors having saw teeth on their peripheries and pivotally supported so as to move to and from the surface of the ground; said rotors being supported on spring-like skids which run over the surface of the ground and support the rotors at a predetermined position spaced above the ground.

Another object is to provide means for counterbalancing the weight of the rotor arm and the driving means which rotates it in the direction of travel.

Still another object is to provide means in the above devices for resiliently supporting the weight of the rotors on each supporting arm and the driving mechanism to relieve the skids of a part of the weight of these parts.

Still another object is to provide means for collecting and removing cotton salvaged by said rotors and conveying it to the cotton receiving cage used by the mechanism when it is connected to cotton picking mechanism.

Other objects will appear hereinafter.

I attain the foregoing objects by means of the devices, parts and combinations of parts shown in the accompanying drawings, in which—

FIGURE 3 is a side elevational view of one of the salvaging units, drawn on an enlarged scale;

FIGURE 4 is a rear elevational view of the salvaging element shown in FIGURE 3;

FIGURE 5 is a partial plan view of the salvaging unit shown in FIGURE 3;

FIGURE 6 is an enlarged fragmentary view of the salvaging unit viewed from line 6—6 of FIGURE 3.

Similar numerals refer to similar parts in the several views.

Figure 1:
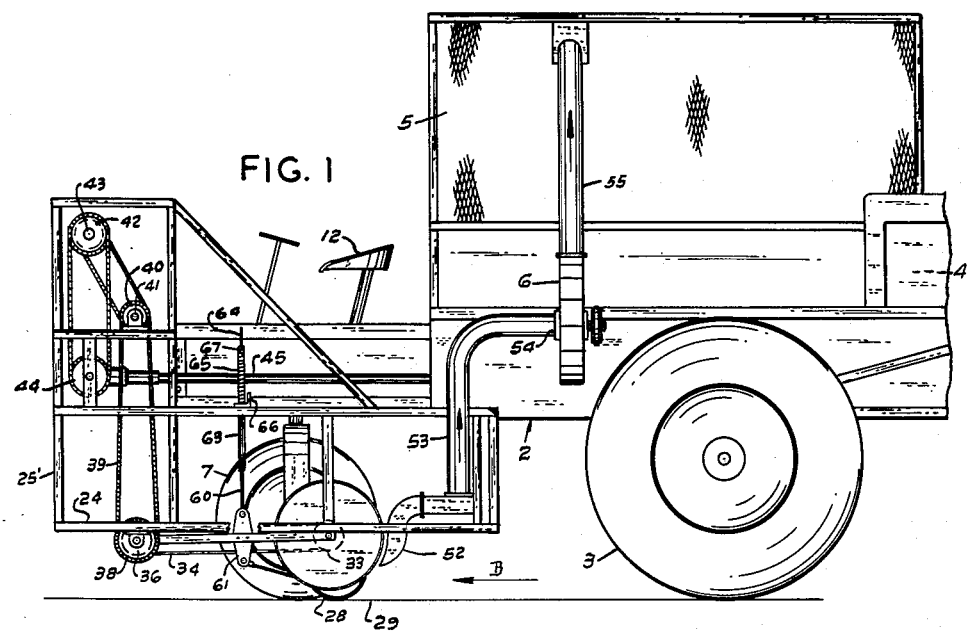
FIGURE 1 is a side elevational view of a conventional cotton picker equipped with my salvaging device.
Figure 2:
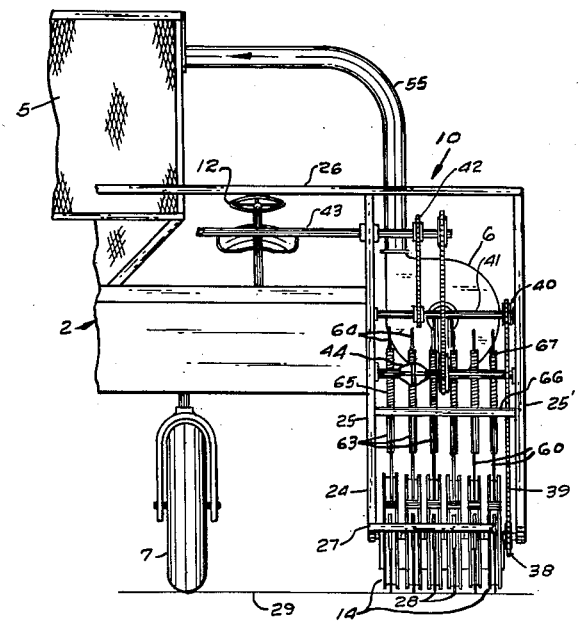
FIGURE 2 is a front elevational view of one side of the device as shown in FIGURE 1.

The broad aspects of the device are shown in FIGURES 1 and 2 and these include the body 2 of a standard cotton picker such as International Harvester picker, which has the supporting wheels 3 and engine 4 which drives the supporting wheels 3 by conventional means, a cotton receiving cage 5 and a blower 6 driven by engine 4.

The salvaging unit bolts onto the front end of the body 2 and extends on both sides of the center steering wheel 7 of the cotton picker body and is divided into left and right units. Only the left unit 10 is shown in FIGURE 2. It is to be understood that the right unit is the right counter part of the left unit. The right and left units are determined from the driver's seat 12.

The salvaging unit mechanism in the unit 10 includes six salvaging elements 14. Each of these units is the same in structure.

Reference is made to FIGURE 3 to show the details of each of the salvaging units. Each unit consists of a pair of rotors 16 and 16', each, having saw teeth 17 on its periphery. These teeth have points 18 directed in the direction of rotation travel as indicated by arrow 19.

Each rotor is supported on a hub 20 which has bearings 21 which support it on the supporting arms 22 and 22'. The supporting arms are pivotally attached to and supported on pins 23 which are included in a frame 24. This frame is composed of upright members 25 and 25' tied together by horizontal members 26 at the top and 27 at the bottom. This framework supports the transverse shaft 23 at the front so that the members 22 and 22' are free to pivot up and down as required by the skids 28 which run on the ground 29.

Skids 28 are hinged at 30 to plate 61. Bar 134 is welded on the lower portion of plate 61. A bar 131 is hinged and separated relative to bar 134 by loose bolts 135, and is provided with a tension screw 31 which bears on the spring 132, which, in turn, bears resiliently on the upper flap 133 of hinge 30. The lower flap of this hinge is attached to bar 134 and becomes, in fact, part of hinge joint 30.

The skids 28 are adjustable on the hinge joint 30 by the adjusting screw 31, so that the tension with which they bear on the ground 29 may be varied. Reference to FIGURE 4 shows that there is one skid, such as 28, for each salvaging element, therefore, in the gang of units, as shown in FIGURE 2, there are six skids, each supporting a pair of salvaging picker saws 17.

Attached to the hub 21 of each pair of saws, there is a pulley 33. The belt 34 runs over this pulley and extends forward to a pulley 36 on shaft 23. The tension on the belt is maintained by an idler pulley 37, which is made adjustable by pivotally mounted plate 22". Shaft 23 extending transversely in frame 24 is driven by a sprocket 38 and a chain 39 which derives motion from a sprocket 40 on shaft 41 on the upper part of frame 10. This shaft is, in turn, driven by a sprocket 42 on shaft 43 which extends transversely in the upper forward part of the machine and is, in turn, driven by gearing 44 from power takeoff shaft 45 which is carried on the body 2 and driven by engine 4.

From the foregoing, it will be seen that the gang of gleaner saws 14 travels in a counter-clockwise direction (FIGURE 3), as the machine body 2 rolls over the ground. Cotton tufts 50 lying on the ground are snagged by the teeth 18 of each of the saws as they pass over the ground. The skids 28 keep the teeth just above the surface of the ground but out of contact with it so as to avoid excess wear.

As the teeth pass over the ground they snag the cotton tufts 50 and carry them rearwardly and upwardly to a point approximately designated by the letter A. At this point there is a shroud or suction receiver 52 which is connected to a suction pipe 53 which derives its suction from intake 54 of blower 6. Cotton picked up through the pipe 53 is then conveyed through the blower out-put pipe 55 to the cotton receiving cage 5.

In this way all cotton which comes in contact with any one of the saws 17 of gang 14, is picked up and quickly transferred through the hood 52 to the cage 5. Suction of hood 52 has been found sufficient to remove the tufts off the teeth 18 on each of the rotors 17.

It is to be understood that the weight of the arm 22 and the rotor 17 and the other parts above mentioned, is not supported entirely on skids 28. I have found that it is necessary to provide an assistant weight carrying or counterbalancing mechanism, including a rod 60, which extends from plates 61 and 61' on supporting member 22, in each instance, up through a guide tube 63 to an adjusting screw 64. A spring 65 operates between the frame member 66 and the adjusting nut 67 on screw 64. In this way the amount of yieldable lift transmitted to the arm 22 is easily adjustable. Consequently the skids 28 have only a light counterbalanced weight to carry.

Since the unit 10 has a counter part on the right side of the front portion of the machine body 2, two rows of down cotton can be salvaged at the same time. After two rows have been gleaned by the machine the operator runs the machine in a parallel path somewhat to the right or left of the rows previously salvaged.

It is to be understood that rotors 17 travel in a direction they would attain by rolling over the ground in the direction indicated by arrow B, FIGURE 3. To operate as desired, however, they have a speed faster than they would have by reason of contact with the ground. This is necessary in order to pick up cotton from the ground. This speed should be approximately 25 percent greater than ground speed and when this is done the teeth on the rotors pick up the cotton tufts C and transmit them to position A where they are drawn into the shroud 52. The rotors revolve above the ground just out of contact with it. The spring supports 28 press down against the ground in each case with a slight pressure.

I have found that in operation the cotton salvaged by this mechanism is clean and comparatively free from sticks, trash and dirt. This is because the peripheral movement of each of the rotors is comparatively rapid and the teeth of the rotors will only hold the fibers of the cotton tufs and they will not hold anything as dense or stiff as leaves, sticks and other pieces of trash. Furthermore the cotton tufts 50 snagged by the teeth 18 of each of the rotors 17, have a short distance to travel before they reach the area A. In normal use the cotton, once it is snagged, has very little time to drop from the teeth, even though the tufts are not firmly snagged. Just as soon as the tufts reach the area A air suction is applied and they are drawn from the teeth and sucked into the pipe 53. It will be noticed that the area A is a sufficient distance above the surface of the ground so that suction draft entering the shroud 52 does not draw dirt, sticks, leaves or trash from the ground into the pipe 53.

I claim:

1. A cotton salvaging machine for use on a wheeled implement having a body, an engine on said body, a steering wheel and means for guiding said steering wheel, a cotton receiving cage on said body, a blower on said body, driven by said engine having a discharge pipe opening into said cage, driving wheels operated by said engine to propel said implement, cotton salvaging units comprising a plurality of pairs of rotatably driven cotton salvaging disc-like rotors along each side of said frame with teeth on their peripheries, each of said pairs of rotors being pivotally attached to the forward end of said implement body, counterbalancing means individually and resiliently suspending each pair of said cotton salvaging rotors with said teeth on their peripheries directed in the direction of rotation, mechanism for driving said rotors connected to said engine in the same rotative direction as said driving wheels and at a speed greater than the ground speed traversed by said implement, a shroud having a hood covering the rear mid portion of said rotors, a pipe connecting said shroud to the intake suction opening of said blower, a pipe connecting the outlet of asid blower to said cotton receiving cage.

2. A cotton salvaging machine for use on a wheeled implement having a body, an engine on said body, a steering wheel and means for guiding said steering wheel, a cotton receiving cage on said body, a blower on said body, driven by said engine having a discharge pipe opening into said cage, supporting wheels operated by said engine to propel said implement, cotton salvaging units on each side of said implement body disposed to run and operate above the ditches between rows of cotton plants, each of said units comprising a frame removably attached to said implement body, a shaft mounted transversely across said frame, a plurality of pairs of supporting arms mounted to said shaft on each side of said frame to pivot about the axis of said shaft, a pair of disc like salvaging rotors individually mounted between each pair of said supporting arms, a skid resiliently attached to the mid-portion of each pair of said supporting arms and extending downwardly and rearwardly to the ground, holding said rotor a short distance above the ground, a counter balancing spring support disposing each of said arms intermediate the pivoted support at the front end of said arm and the rotor at the rear of said arm, pulley and belt mechanism for driving each of said rotors from said transverse shaft, mechanism for driving said shaft from the engine on said implement body, at a speed so that the peripheral speed of each rotor exceeds the speed at which the implement moves over the ground, a shroud hood, having an inlet opening, disposed on said frame so that said inlet opening is opposite the mid portion of the rear of each of said rotors, and a pipe connecting said shroud hood to the suction inlet of said blower.

3. A cotton salvaging machine for use on a wheeled implement having a body, an engine on said body, a steering wheel and means for guiding said steering wheel, a cotton receiving cage on said body, a blower on said body, driven by said engine having an inlet and a discharge pipe opening into said cage, supporting wheels operated by said engine to propel said implement, a frame removably attached to said implement body, a plurality of salvaging elements on each side of said frame each comprising a generally horizontal supporting arm pivotally mounted on said frame at its forward end and extending rearwardly, a rotor having cotton pickup teeth on its periphery journalled on said arm, a skid resiliently attached to the mid-portion of said arm and extending downwardly and rearwardly to the ground, holding said rotor a predetermined distance above the ground, an adjustable counter balancing spring support disposed on said arm at substantially the mid-portion of said arm, power mechanism for driving each rotor, a shroud hood, having an inlet opening, disposed on said frame so that said inlet opening is opposite the mid portion of the rear of said rotor, and a pipe connecting said shroud hood to the inlet of said blower.

4. The device described in claim 3 wherein the rotor has pointed teeth with said teeth pointed at an angle in the direction of rotation and wherein said rotation is in the direction the rotor would travel to travel over the ground in the direction of movement of the implement.

References Cited in the file of this patent
UNITED STATES PATENTS

| 938,864 | Houghton | Nov. 2, 1909 |
| 1,836,128 | Palmer | Dec. 15, 1931 |
| 1,879,823 | Ray | Sept. 27, 1932 |